(12) United States Patent
Henriott et al.

(10) Patent No.: US 6,408,482 B1
(45) Date of Patent: Jun. 25, 2002

(54) STANDARDIZED FURNITURE UNIT AND BRACKET THEREFOR

(75) Inventors: Jay M. Henriott, Jasper; Grover L. Miller, Chrisney; Chad M. Schnell, Jasper, all of IN (US)

(73) Assignee: Kimball International, Inc., Jasper, IN (US)

(*) Notice: Subject to any disclaimer, the term of this patent is extended or adjusted under 35 U.S.C. 154(b) by 0 days.

(21) Appl. No.: 09/145,768

(22) Filed: Sep. 2, 1998

Related U.S. Application Data (60) Provisional application No. 60/058,311, filed on Sep. 9, 1997.

(51) Int. Cl.[7] ............................................. B60B 33/00
(52) U.S. Cl. .......................... 16/29; 16/31 R; 16/32; 312/351.13
(58) Field of Search .................. 16/31 R, 29, 35 R, 16/32, 33, 37, 30, 18 R; 312/351.13, 351.11; 248/220.1; 403/231, 230, 205

(56) References Cited

U.S. PATENT DOCUMENTS

| | | | |
|---|---|---|---|
| 331,211 A | * 11/1885 | Osborn | |
| 849,999 A | 4/1907 | Hendricks | |
| 1,090,675 A | * 3/1914 | Bell | 16/29 |
| 1,174,582 A | * 3/1916 | Irrgang | 16/32 |
| 2,529,390 A | 11/1950 | Hauer | |
| 2,698,454 A | * 1/1955 | Meyer | 16/32 |
| 2,717,410 A | * 9/1955 | Holloman | 16/29 |
| 2,725,667 A | 12/1955 | Ingarra | |
| 2,738,539 A | 3/1956 | Schultz, Jr. | |
| 2,803,510 A | * 8/1957 | Carbary | 312/351.13 |
| 2,828,578 A | * 4/1958 | McCabe | 16/32 |
| 2,888,706 A | * 6/1959 | Gibson | 16/29 |
| 3,356,434 A | * 12/1967 | Theodores | 312/351.11 |
| 3,432,878 A | * 3/1969 | Hupfer | 16/32 |
| 3,482,894 A | * 12/1969 | Pryor | 312/351.13 |
| 3,639,942 A | 2/1972 | Ostrom | |
| 3,912,407 A | * 10/1975 | Heininger | |
| 4,015,808 A | 4/1977 | Carroll | |
| 4,066,370 A | * 1/1978 | Van Driessche | |
| 4,187,578 A | 2/1980 | Little | |
| 4,459,920 A | 7/1984 | Cwik | |

(List continued on next page.)

FOREIGN PATENT DOCUMENTS

JP          62214003 A  * 9/1987  ..................... 16/32

*Primary Examiner*—Lynne H. Browne
*Assistant Examiner*—Mark Williams
(74) *Attorney, Agent, or Firm*—Baker & Daniels (57) ABSTRACT

A bracket for a furniture unit including an upper mounting plate and a lower mounting plate, one of the upper and lower mounting plates providing a mount for a caster, the other of the upper and lower mounting plates providing a mount for a leveler. A bracket for a furniture unit including a substantially horizontal mounting plate provided with a substantially vertical aperture through which a leveler extends, the leveler having means for adjusting the leveler from a location above the bracket. A bracket for a furniture unit including an upper mounting plate and at least one sidewall depending therefrom which define a chamber open from below in which a caster is disposed. A furniture unit for a standardized furniture system including at least two substantially vertical side panels and bracing extending therebetween, the intersection of the bracing and the side panels defining interior corners in one of which a bracket is disposed, the bracket including an upper mounting plate and a lower mounting plate, a leveler connected to the lower mounting plate, and/or a caster connected to the upper mounting plate. A standardized furniture unit including a structure having at least two substantially vertical panels, each of which has a lower edge, and bracing extending between the panels, decorative, non-supportive base skirting disposed about the structure, and means excluding the skirting for supporting the furniture unit on a floor.

23 Claims, 6 Drawing Sheets

U.S. PATENT DOCUMENTS

| | | | |
|---|---|---|---|
| 4,639,005 A | * | 1/1987 | Birkley |
| 4,693,526 A | * | 9/1987 | Spiegel .................. 312/250 |
| 4,747,180 A | * | 5/1988 | Screen |
| 5,046,790 A | * | 9/1991 | Onomoto et al. .......... 312/250 |
| 5,312,078 A | * | 5/1994 | Marsh |
| 5,332,182 A | | 7/1994 | Weisz et al. |
| 5,426,817 A | | 6/1995 | Rekuc |
| 5,924,165 A | * | 7/1999 | Gierer et al. ............. 16/31 R |

* cited by examiner

FIG_3

FIG_4

FIG_1

FIG_2

FIG_5

FIG_6

FIG_11

FIG_7  FIG_8

FIG_9  FIG.10

FIG_12

FIG_13

FIG_14

FIG_16

FIG_15

FIG_17

STANDARDIZED FURNITURE UNIT AND BRACKET THEREFOR

CROSS REFERENCE TO RELATED APPLICATIONS

This application claims the benefit under Title 35, U.S.C. §119(e) of U.S. Provisional Patent Application Ser. No. 60/058,311, entitled STANDARDIZED FURNITURE SYSTEM AND METHOD OF MANUFACTURE, filed on Sep. 9, 1997.

BACKGROUND OF THE INVENTION

1. Field of the Invention

The present invention relates to furniture units, and more particularly to furniture units for standardized office furniture systems.

2. Description of the Related Art

Office furniture manufacturers often manufacture several different product lines of office furniture systems with each product line having a different style or aesthetic appearance. Although many of the individual units of these different product lines are similar, typically each product line is independently designed and developed and component parts of each product line, although similar, are not often interchangeable. This lack of interchangeability may also be present for similar components of different furniture units within a single product line resulting in a large number of distinct components which must be inventoried and utilized in the manufacture of office furniture.

SUMMARY OF THE INVENTION

The present invention provides a standardized manufacturing system for producing a large variety of different furniture units utilizing many common components.

One of the basic building blocks of the standardized furniture system of the present invention is the use of common underlying structures for individual furniture units which may be combined in a modular office furniture system. For example, a common structure for a pedestal unit may be used as the basis for a large variety of different pedestal styles. These pedestal units are designed to permit their combination with other furniture units and components such as standard sized worksurface panels and modesty panels whereby desks and workstations may be easily manufactured by assembling these various units. The common underlying structures may be utilized to manufacture product lines having different styles by the use of distinguishable drawer fronts, doors, moldings, rails, skirting and other features.

To facilitate the compatibility of the different furniture units, the interchangeability of hardware and panels, and promote the efficient machining of the panels and other parts, a 32 millimeter grid is utilized in the design and manufacture of the common underlying structures and other furniture components. A computer assisted design/computer assisted manufacturing system (CAD/CAM system) is utilized with numeric control machinery in the design and manufacture of many of the component parts and panels of the common underlying furniture unit structures and for other panels used in the furniture system. The use of such a CAD/CAM system can greatly facilitate the efficient manufacture of furniture panels on an as needed basis.

Additionally, the present invention also provides several individual furniture parts which may be used to manufacture a common underlying structure of a furniture unit but which are adapted to permit the furniture unit to be finished in a variety of different configurations. For example, a corner bracket for bracing a corner and mounting both stationary leveler and a roller caster may be included in the standard underlying structure. This permits a single underlying structure to be used in both stationary and mobile furniture units and also facilitates the easy modification therebetween of finished furniture units.

An advantage of the present invention is that it reduces the number of furniture panels and hardware which must be inventoried and tracked during the manufacture of office furniture systems.

The present invention provides a bracket for a furniture unit and having an upper mounting plate and a lower mounting plate. One of the upper or the lower mounting plates provides a mount for a caster; the other mounting plate provides a mount for a leveler.

The present invention also provides a bracket for a furniture unit and having a substantially horizontal mounting plate provided with a substantially vertical aperture through which a leveler extends. The leveler is provided with means for adjusting the leveler from a location above the bracket.

The present invention also provides a bracket for a furniture unit in which the bracket includes an upper mounting plate and at least one sidewall depending therefrom. The upper mounting plate and the sidewall(s) define a chamber open from below. A caster is disposed in the chamber.

The present invention also provides a standardized future unit including at least two substantially vertical side panels. Bracing extends between the sides panels, the intersection of the bracing the side panels defining interior corners. A bracket is disposed in at least one of these interior corners and includes an upper mounting plate and a lower mounting plate, a leveler connected to the lower mounting plate, and/or a caster connected to the upper mounting plate.

The present invention also provides a standardized furniture unit including a structure having at least two substantially vertical panels, each of which has a lower edge, and bracing extending between the panels. Decorative base skirting is disposed about the structure and the furniture unit includes means excluding the skirting for supporting the furniture unit on a floor.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The embodiments disclosed in the following detailed description are not intended to be exhaustive and are not to be construed as limiting the scope of the invention to the precise forms disclosed.

DESCRIPTION OF THE PRESENT INVENTION

The present invention provides a system for manufacturing office furniture systems in a standard and efficient manner. The present invention also provides several individual parts and methods which are useful in the manufacture of office furniture systems as described below.

The utilization of a grid system provides significant advantages in the design and manufacture of office furniture systems. The grid is a set of points defining a rectilinear grid pattern of points defined by the intersection of columns and rows (oriented at a 90° angle relative to each other) wherein the columns and rows are offset by 32 millimeters. Bore holes for connectors, dowels, shelf supports, drawer slides, etc. located on the panels used in the furniture system are placed on the grid, i.e., centered on one of the points where the columns and rows intersect. The first vertical column of the grid is spaced 37 millimeters from the front edge of vertically oriented panels and the grid is expandable in 32 millimeter increments from that column. The 37 millimeter spacing of the first grid column from the front edge of vertically oriented columns was chosen to facilitate the use of a significant quantity of hardware available in the market which employs this spacing. Employing a common grid for all product lines and all types of furniture units enhances the potential for utilizing common parts in each product line and between furniture units within a product line.

A 32 millimeter grid is advantageous because many suppliers manufacture high quality price competitive "off the shelf" hardware fixtures using increments of 32 millimeters and the use of a grid based upon 32 millimeters facilitates the use of these hardware fixtures. The selection of 32 millimeters is also advantageous because the equipment used to machine the furniture panels is available with drill/spindles which are spaced to have center to center distances which are increments of 32 millimeters.

Figure 1:
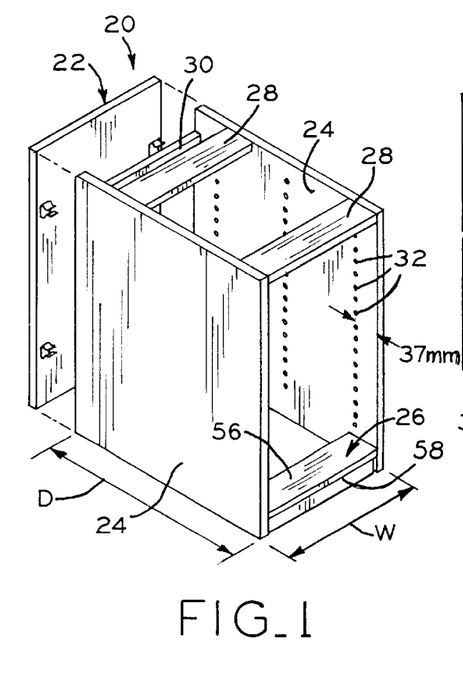
FIG. 1 is a perspective view of the underlying structure of a pedestal unit.

FIG. 1 shows the underlying structure 20 of a pedestal unit which is suitable for use under the worksurface of a desk or workstation or as a freestanding unit. Illustrated pedestal structure 20 utilizes standardized components such as a standard back panel 22 which pops on and off, standard side panels 24, L-shaped bracing members 26, top bracing members (spanners) 28 and back bracing members (spanners) 30. Side panels 24 include blind bore holes 32 which are positioned on the 32 millimeter grid with the first vertical line of holes spaced a distance of 37 millimeters from the front edge of side panels 24. The use of interchangeable standardized components allows pedestal structure 20 to be manufactured in a plurality of different sizes and for a plurality of different product lines while utilizing a minimal number of different parts. For example, a standardized manufacturing system could be set up to manufacture standard sized pedestal structures 20 in nominal depths D of 24", 30" and 36" and nominal widths W of 15", 18", 30", 36" and 42" and in one or more standard heights.

An inventory of the basic panels and other common components, such as fasteners and braces, may then be maintained and an appropriately sized underlying pedestal structure 20 may then be assembled as needed to form a pedestal unit for any one of a number of different product lines. By utilizing the same standard underlying pedestal structures 20 for different product lines and minimizing the number of different panels and other components needed to manufacture differently sized standard pedestal structures 20, substantial reductions in inventory and substantial efficiencies in the manufacturing process are achievable.

Although underlying structure 20 may be identical for pedestal units in different product lines, the product lines can have substantially different styles by utilizing differently styled drawers, hardware and tops, or by attaching skirting, moldings, or additional side panels, to thereby finish underlying structure 20 in a manner which produces a distinguishable and aesthetically pleasing pedestal unit.

By manufacturing the different furniture units with standard nominal depths and widths, similarly sized panel stock can be utilized in the manufacture of the different units. Additionally, the use of common exterior dimensions based upon common increments also promotes the modularity of the office system by allowing the different furniture units to be more easily combined in different combinations. The use of a common grid system for each of the different furniture units also promotes the efficient machining of the panels used in their manufacture. It is also desirable to place the major horizontal lines of the various furniture units at common levels to provide a harmonious visual appearance and promote the modularity of the various units. In addition to horizontal modularity, which is enhanced by using furniture units with common widths and depths and multiples of these common dimensions, vertical modularity is also desirable. By selecting a limited number of horizontal distances above the floor and aligning major horizontal elements of the furniture units therewith, and/or with multiples or integral fractions of these vertical distances, the modularity and visual harmony of the furniture units can be facilitated.

As previously mentioned, pedestal units for a variety of different product lines may be manufactured utilizing a common underlying structure which will now be discussed in greater detail.

Figure 2:
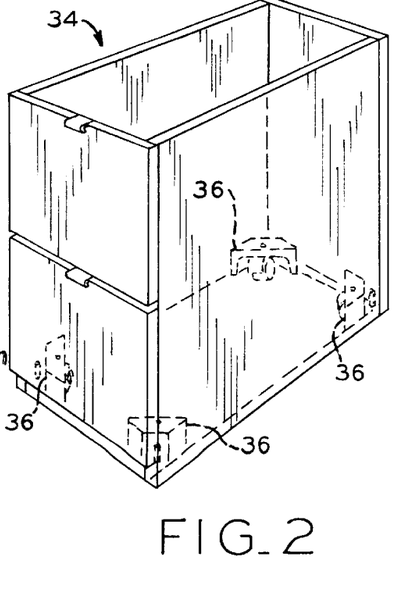
FIG. 2 is a perspective view of a pedestal unit having four corner brackets.
Figure 3:
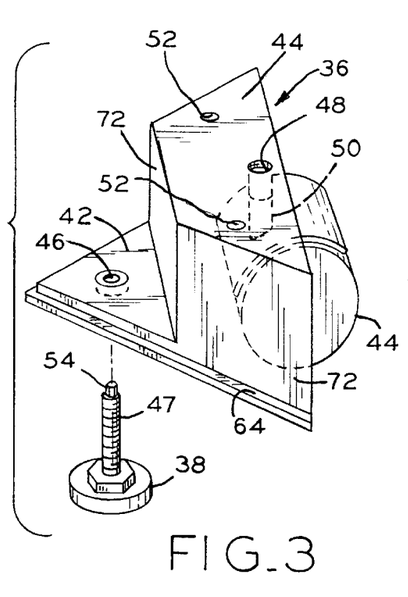
FIG. 3 is an upper perspective view of a corner bracket for a furniture unit.
Figure 4:
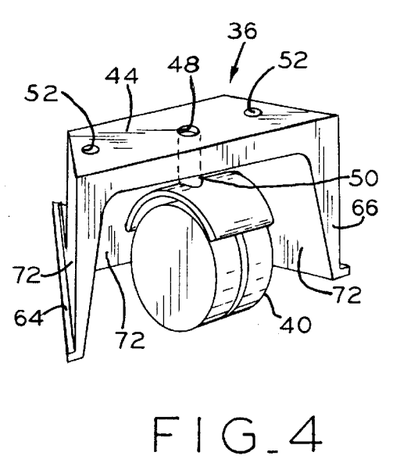
FIG. 4 is another upper perspective view of the corner bracket of FIG. 3.
Figure 5:
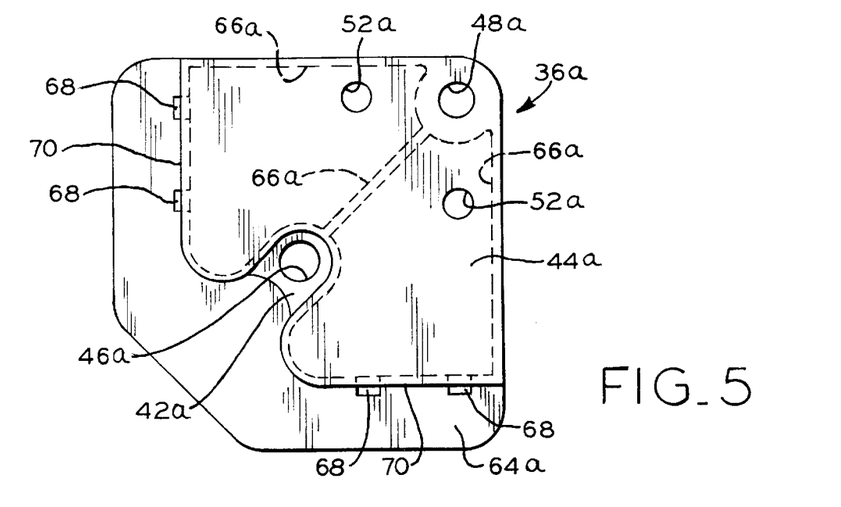
FIG. 5 is a top view of a first alternative corner bracket.

A common feature of each pedestal unit 34 is the use of four corner brackets 36 near the bottom corners of its pedestal structure 20 as schematically shown in FIG. 2. Referring to FIGS. 3 and 4, each corner bracket 36 may include both leveler 38 and roller caster 40. Providing a corner bracket such as bracket 36, which can be used with both caster 40 and leveler 38, permits a single corner bracing element to be used in pedestal unit 34. The use of corner bracket 36 also permits each pedestal unit 34 to be easily modified to form either a mobile or stationary unit. Alternative corner bracket 36a is shown in FIGS. 5 and 6.

Figures 6, 11:
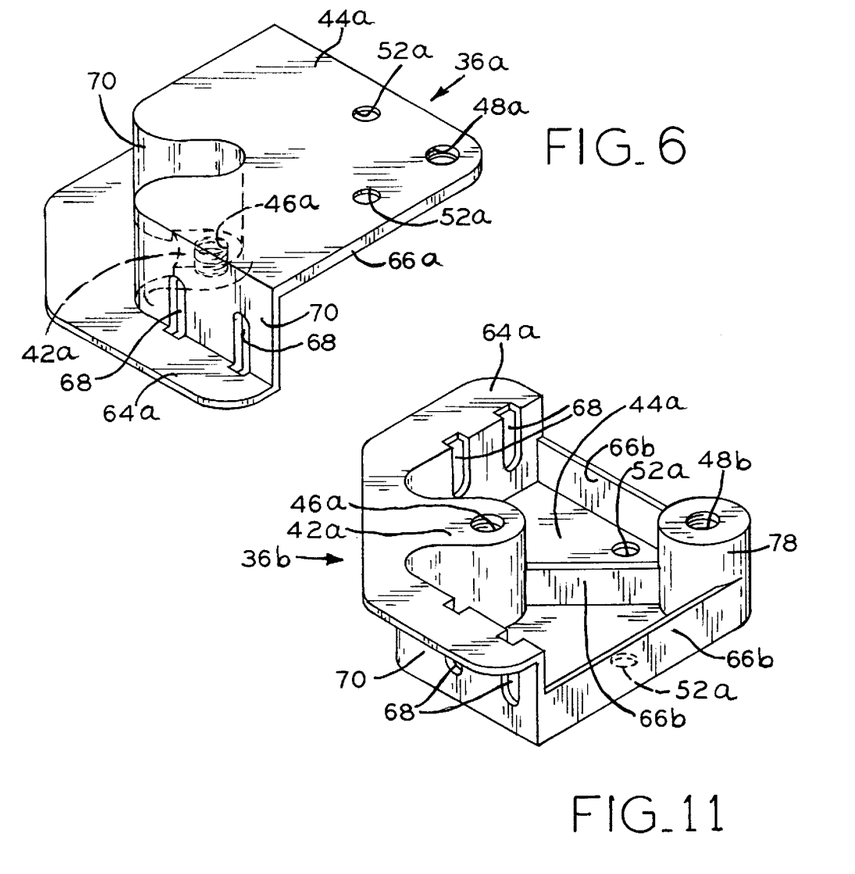
FIG. 6 is an upper perspective view of the corner bracket of FIG. 5.
FIG. 11 is a lower perspective view of a second alternative corner bracket.
Figure 7:
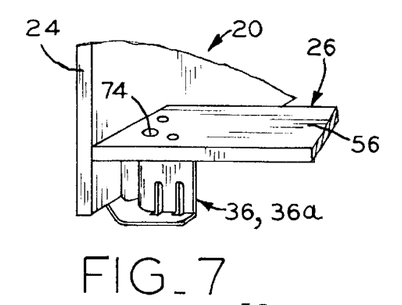
FIG. 7 is a cutaway upper perspective view of the corner bracket of FIG. 5 in a pedestal unit.
Figure 8:
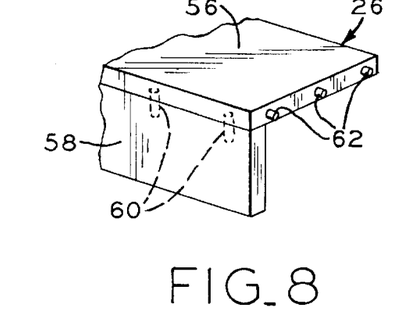
FIG. 8 is a partial upper perspective view of a brace for a pedestal unit.
Figure 9:
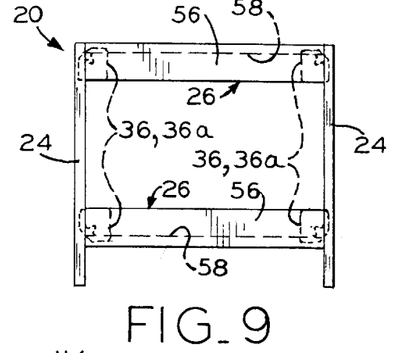
FIG. 9 is a top view of the underlying structure of a pedestal unit.

Referring to FIGS. 3–11, corner brackets 36, 36a have lower mounting plate 42, 42a and upper mounting plate 44, 44a, respectively. Lower mounting plate 42, 42a includes aperture 46, 46a for threadingly receiving stem 47 of leveler 38; upper mounting plate 44, 44a has aperture 48, 48a for threadingly receiving stem 50 of caster 40. Upper mounting plate 44, 44a also respectively include a pair of apertures 52, 52a through which fasteners secure corner brackets 36, 36a to wooden brace 26. As shown in FIG. 9, wooden bracing member 26 spans between side panels 24 of pedestal structure 20, and includes top member 56 and vertical member 58. Brace members 56 and 58 are attached together with vertically-oriented dowels 60 (FIG. 8). Horizontally-oriented dowels 62 are used to attach top member 56 to side panels 24, and are installed in pre-bored holes located on the 32 mm grid.

Figure 10:
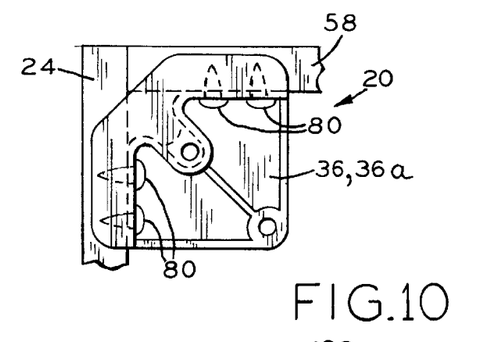
FIG. 10 is a bottom view of the corner of a pedestal unit and corner bracket.

Brackets 36, 36a also include lower flange 64, 64a, at least a portion of which is positioned beneath the lower edges of side panel 24 and brace vertical member 58. Bracket lower flange 64, 64a does not, however, extend across the entirety of the lower edge of either side panel 24 or brace vertical member 58. Hence, as seen in FIG. 10, which is a bottom view of pedestal structure 20 with corner bracket 36a installed, the outside edge of lower flange 64a is recessed with respect to the exterior surfaces of side panel 24 and brace vertical member 58. Corner brackets 36, 36a are thus hidden from view in pedestal units 34 which do not include skirting and prevents corner brackets 36, 36a from interfering with skirting installation, as will be discussed in greater detail below. Further, as seen in FIGS. 3–6, corner brackets 36, 36a respectively include stiffening flange 66, 66a which enhances bracket strength and rigidity.

FIG. 11 illustrates another alternative corner bracket 36b which may be used in pedestal units 34 or other furniture units having skirting 76 attached thereto and with which the ability to use casters is desired. Corner bracket 36b is identical to bracket 36a except in that it has spacer boss 78 depending from upper mounting plate 44a and having aperture 48b in which stem 50 of caster 40 is threadedly received, and has somewhat deeper stiffening flanges 66b; features of brackets 36a and 36b are otherwise identically referenced. Extended boss 78 places the lower opening of aperture 48b at the same level as the lower opening of leveler stem receiving aperture 46a. By using corner brackets 36 or 36a in pedestal units 34 without skirting, and using corner brackets 36b in pedestal units 34 having skirting 76, common casters 40 may be used in pedestal units with or without skirting. The use of skirting will be discussed further below.

Figure 12:
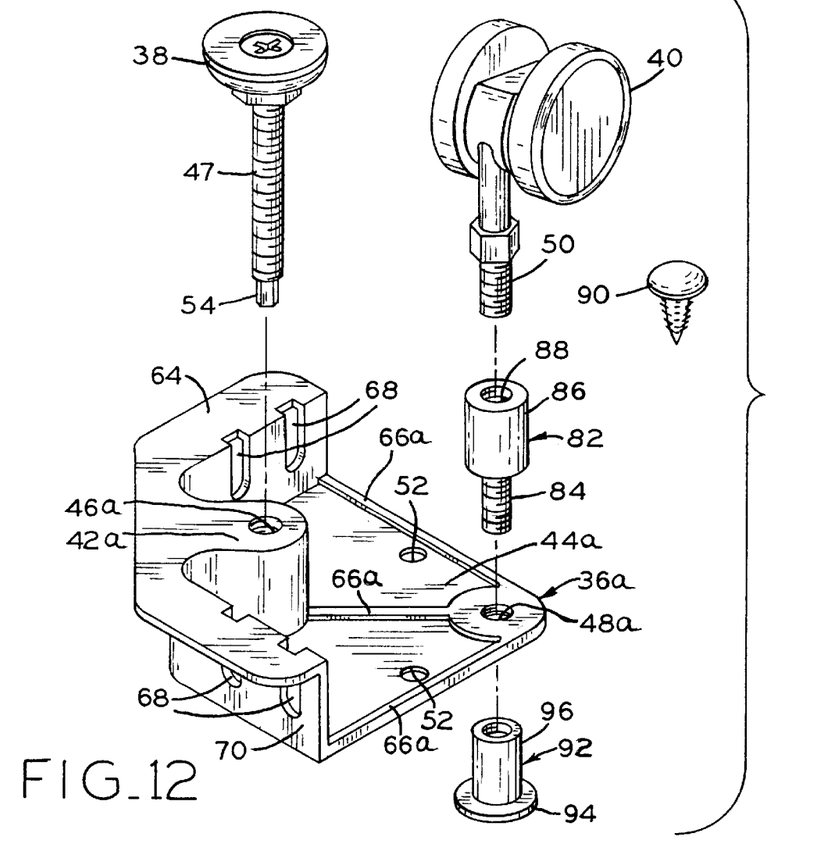
FIG. 12 is an exploded, lower perspective view of the corner bracket of FIG. 5 in an assembly having a coupler bolt and joint connector nut.
Figure 13:
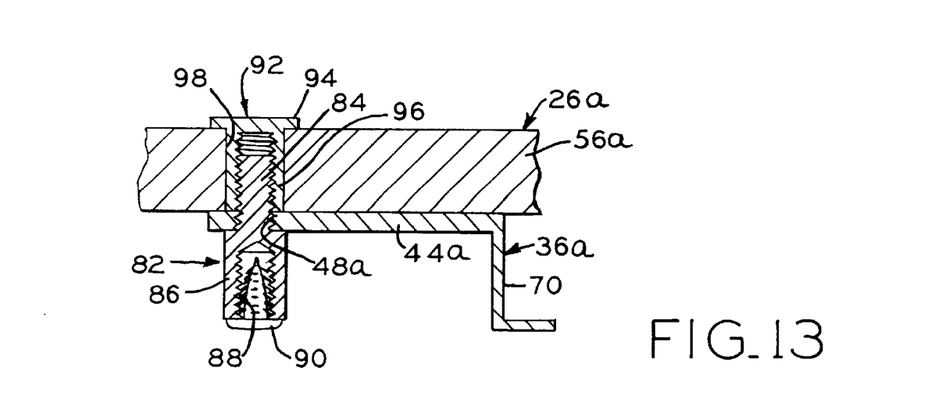
FIG. 13 is a fragmentary, sectional side view of a pedestal unit including the corner bracket assembly of FIG. 12, without a caster.

When implementing a manufacturing system, it would be advantageous to select bracket 36, bracket 36a or bracket 36b and thereby limit the number of differently designed corner brackets which would need to be manufactured and inventoried. Referring now to FIGS. 12 and 13, as an alternative to using corner bracket 36b in pedestal units having skirting 76, corner bracket 36a may be used with coupler bolt 82 having male portion 84, which is threadedly received in aperture 48a, and spacer portion 86, which places the opening of its threaded aperture 88 at the same level as the lower opening of leveler stem receiving aperture 46a. This allows a single corner bracket design (e.g., 36a) to be employed in pedestal units with and without skirting. As indicated above, pedestal models without skirting may use caster 40 and corner bracket 36a without coupler bolt 82; models with skirting would use bolt 82 to accomplish the spacing function of cylindrical boss 78 of bracket 36b, stem 50 of caster 40 threadedly received in coupler bolt aperture 88. If casters are not desired, coupler bolt 82 may still be used for attachment of bracket 36a to horizontal brace top member 56, as will be discussed further below. Where a caster is not used with coupler bolt 82, plastic "Christmas tree" plug 90 may be used to plug aperture 88, as shown in FIG. 13.

Joint connector nut 92, having flanged head 94 and female threaded portion 96, may be used for attaching corner bracket 36a to horizontal member 56a of brace 26a, which is identical to horizontal member 56 of brace 26 except that it is provided with bore 98 through which female threaded portion 96 extends. The thickness of member 56a is slightly greater than the length of female threaded portion 96. Thus, when joint connector nut 92 is tightened by means of an Allen key engaged with the hexagonal drive hole (not shown) centrally located in flanged head 94, member 56a is tightly held between head 94 and upper mounting plate 44a, securing attaching bracket 36a to brace 26a. It can be easily visualized that joint connector nut 92 and brace 26a may be used without coupler bolt 82 on skirtless pedestal units having casters; joint connector nut 92 would then be threadedly received directly on caster stem 50, the spacing function provided by coupler bolt 92 not being needed. In the foregoing discussion of coupler bolt 82 and joint connector nut 92, corner bracket 36 may be substituted for corner bracket 36a. Further, where joint connector nut 92 and brace 26a are utilized, fasteners attaching bracket 36, 36a to horizontal brace top member 56a via bracket apertures 52, 52a may not be necessary; these apertures may then be eliminated from bracket upper mounting plate 44, 44a.

Stem 47 of levelers 38 are threadingly received in bracket aperture 46, 46a. Levelers 38 can be adjusted from above with a hex driver (not shown) which engages the cooperating terminal end 54 of stem 47. Horizontal brace top member 56, 56a is provided with bore 74 or other opening through which stem 47 extends with some clearance thereto, thus providing top access to hexagonal stem terminal end 54. In bracket 36, 36a, 36b, aperture 46, 46a is inwardly spaced from the outer bracket perimeter to preclude the intersection of brace bore 74 and any of dowels 62 in brace top member 56, 56a.

Brackets 36*a*, 36*b* include elongate slots 68 located in sidewalls 70. Fasteners 80 extend through slots 68 to secure brackets 36*a*, 36*b* to side panels 24 and brace vertical members 58. By means of this attachment, brackets 36*a*, 36*b* provide additional bracing of the corners of pedestal structure 20, as can be seen in FIGS. 7, 9 and 10 (brace vertical member 58 is not shown in FIG. 7). Slots 68 intersect lower flange 64 of bracket 36*a*, 36*b* to facilitate the casting of the bracket. Those skilled in the art will recognize, however, that smaller apertures in sidewalls 70 may be provided in lieu of slots 68 for accommodating fasteners 80. From the preceding descriptions it can be readily seen that sidewalls 72 of bracket 36 and sidewalls 70 of bracket 36*a*, 36*b*, together with respective upper mounting plate 44, 44*a*, form a chamber which is open from below and in which caster 40 is mountable.

A variety of materials may be used to manufacture corner brackets 36, 36*a*, 36*b*, including plastics and metals. For example, corner bracket 36*a* is a zinc casting. Aperture 48, 48*a* is tapped after casting to allow it to receive threaded stem 50 of caster 40 and thereby permit all pedestal units 34 to be easily modified and become mobile units by the addition of casters 40.

Although the description of the installation of corner brackets 36, 36*a*, 36*b* has been limited to pedestal units 34, brackets 36, 36*a* or 36*b* could also be installed in other furniture units such as desks, book cases, storage units and lateral file units thereby allowing all of these units to share a common corner bracket and further reducing the number of parts required to manufacture all of the furniture units. As with pedestal units 34, other units having brackets 36, 36*a*, 36*b* could be either stationary or mobile and easily changed therebetween.

Pedestal structure 20 may be used in a variety of different product lines which may have quite different styles and appearances. For example, contemporary styles often have relatively little ornamentation while more traditional styles often have relatively elaborate ornamentation. A common feature of traditional designs is an articulated base while contemporary designs often allow the bottom edge of side panels 24 to define the lower limit of the pedestal unit. To enable a single pedestal structure to be used in both contemporary and traditional product lines, pedestal structure 20 is adapted to receive a skirting framework 76 to thereby form a pedestal unit 34 having a base.

Figures 14, 15, 16, 17:
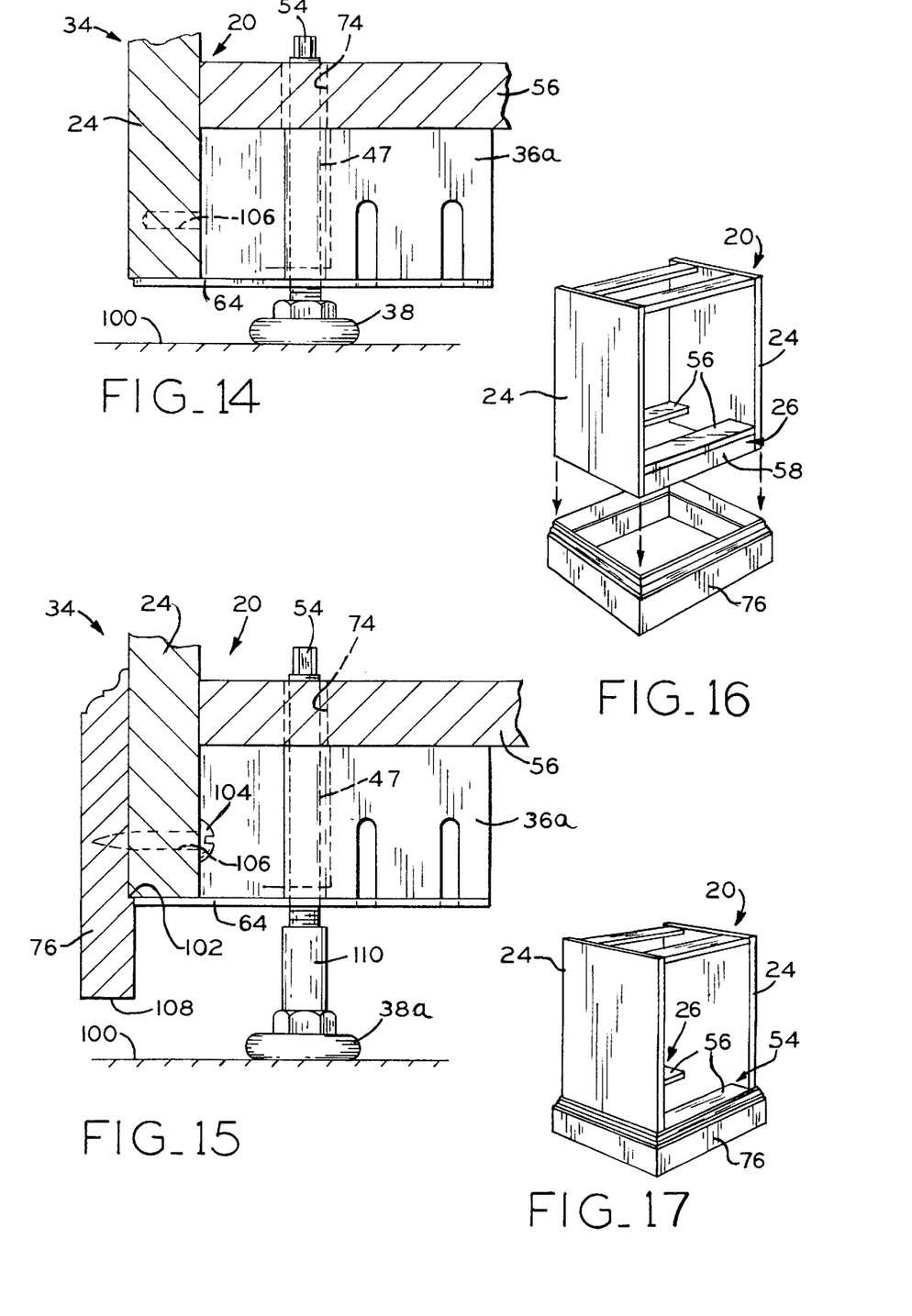
FIG. 14 is sectional side view of a bottom corner of a pedestal unit.
FIG. 15 is a sectional side view of a bottom corner of a pedestal unit having a skirting framework.
FIG. 16 is a perspective view of a pedestal unit being lowered into a skirting framework.
FIG. 17 is a perspective view of the pedestal unit and attached skirting of FIG. 16.

Unlike conventional pedestals having a base, the vertical load of a pedestal unit 34 according to the present invention which as skirting 76 is carried by corner bracket 36, 36*a*, 36*b* and leveler 38 and/or caster 40. In other words, skirting framework 76 does not provide a structural base for pedestal 34. FIG. 14 schematically illustrates a pedestal unit which does not include skirting 76, being supported by leveler 38. FIG. 15 schematically illustrates a pedestal which does include skirting 76, also being supported by a leveler. Leveler 38*a* shown in FIG. 15 is slightly longer than leveler 38 to accommodate the additional height from which pedestal structure 20 is raised from floor 100 when unit 34 comprises skirting 76.

As can be seen in FIGS. 16 and 17, pedestal structure 20 may be nested into skirting framework 76 by lowering pedestal structure 20 into skirting framework 76. The skirting is then attached to the pedestal structure. Skirting 76, which is formed of 19 millimeter thick stock, includes machined interior ledge 102 (FIG. 15), having a depth of approximately 3 millimeters, which abuts the bottom edges of pedestal structure 20. As previously mentioned, lower flange 64, 64*a* of corner bracket 36, 36*a*, 36*b* is not as wide as the width of side panel 24 or brace vertical member 58; the edges of flange 64, 64*a* are recessed from the exterior side surfaces of panel 24 and member 58, and thereby allow pedestal structure 20 to be seated on ledge 102 of skirting 76 without interference from the corner brackets. Further, in pedestals without skirting, flanges' 64, 64*a* being so recessed hides the corner brackets from view.

Skirting 76 is attached to pedestal structure 20 with screws 104 as shown in FIG. 15. Screws 104 are installed through pre-bored holes 106 which do not extend entirely through the thickness of panels 24. By using blind bore holes 106 located on the 32 millimeter grid, all panels 24 may be identically and efficiently machined. Holes 106 do not penetrate the exterior surface of panels 24 and so are not visible in pedestal units which do not include skirting 76.

Although different height skirting can be used, by placing interior ledge 102 of skirting 76 at a common distance from bottom edge 108 of skirting 76 for all skirting 76, common leveler 38*a* can be used for all pedestal units having skirting 76. For example, all of the skirting 76, or base rails, may extend 25.5 millimeters below the bottom edge of panels 24 when installed and levelers 38*a* may have an extension portion 110 which is 25.4 millimeters in length.

Figures 18, 23:
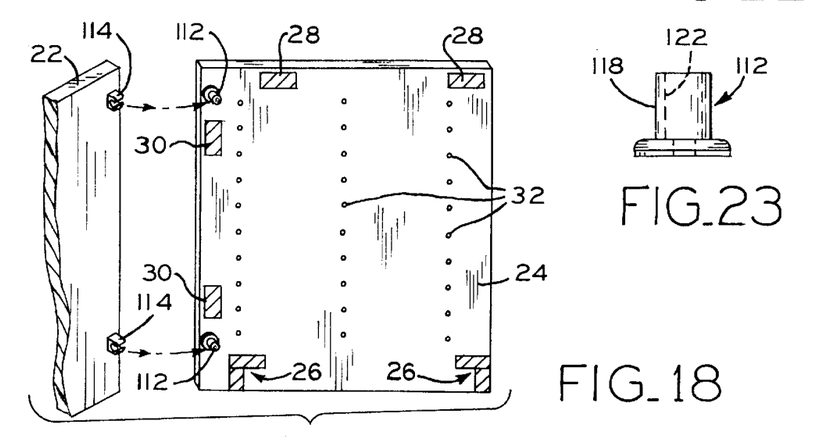
FIG. 18 is a fragmentary perspective view of a back panel and side panel of a pedestal unit with clips and studs attached respectively thereto.
FIG. 23 is a side view of the stud of FIG. 22.
Figure 20:
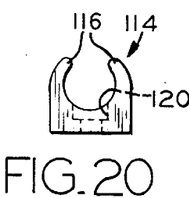
FIG. 20 is a side view of the clip of FIG. 19.
Figure 21:
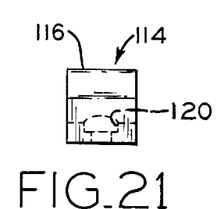
FIG. 21 is another side view of the clip of FIG. 19.
Figure 22:
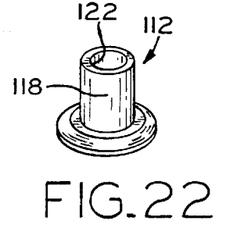
FIG. 22 is a perspective view of a stud.

Referring now to FIG. 18, back panel 22 is attached to side panels 24 of pedestal structure 20 by snap-fitting clips 112 (FIGS. 19–21) over studs 114 (FIGS. 22, 23). The use of clips 112 and studs 114 permits back panel 22 to be easily removed and replaced. Back panels removably attached to furniture units with clips and studs, as shown in FIG. 18 and described in detail below, also may be positioned to define the lower exterior surface of a workstation. Polypropylene may be used to manufacture clips 112 and studs 114. Resilient clip arms 116 flex outward to receive shaft 118 of stud 114 when clip 112 and stud 114 are snap-fitted together. Resilient arms 116 define an interior diameter of 11 millimeters which corresponds to the exterior diameter of shaft 118.

Figure 19:
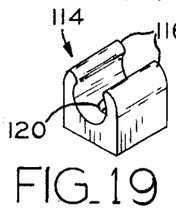
FIG. 19 is a perspective view of a clip.

Clips 112 and studs 114 are respectively attached to panels 22, 24 with screws (not shown) which engage pre-bored holes in the panels on the 32 millimeter grid. Clip 112 includes stepped aperture 120 located between resilient arms 116 for receiving a screw. Stud 114 includes stepped aperture 122 in shaft 118 for receiving a screw. Locating clips 112 and studs 114 at standard positions promotes the interchangeability and efficient manufacture of back panels 22 and side panels 24. Standard locations for clips 112 and studs 114 standardizes the location of the pre-bored holes for securing clips 112 and studs 114 on back panel 22 and side panel 24, respectively, and placing the pre-bored holes on the 32 millimeter grid facilitates the efficient manufacture of the panels.

The removal and reattachment of back panel 22, which can be done without tools, is particularly useful for cable management purposes such as routing power cords and communications cabling immediately adjacent back panel 22. This permits the consumer to easily route such cables when first setting up a furniture unit or when reconfiguring the furniture unit or the power and communication devices thereon. Although not shown in FIG. 18, back panel 22 may also include a cable management strip or other cable management features.

Wooden braces 26, 26*a*, and 28, 30 may take different positions on side panels 24 for the differently sized pedestal units, and larger units may utilize more braces 28, 30. One possible standard configuration of braces 26, 26*a*, 28 and 30 is shown by the cross-hatched outlines on panel 24 in FIG. 18. Metal spanners 124 may be substituted for these wooden braces, however, as shown in alternate pedestal structure 20*a* of FIG. 24. Metal spanners 124 are generally U-shaped in cross-section, stamped from sheet metal, and are attached to side panels 24*a* using fasteners (not shown) secured through apertures 126 located in end flanges 128.

Figures 24, 25:
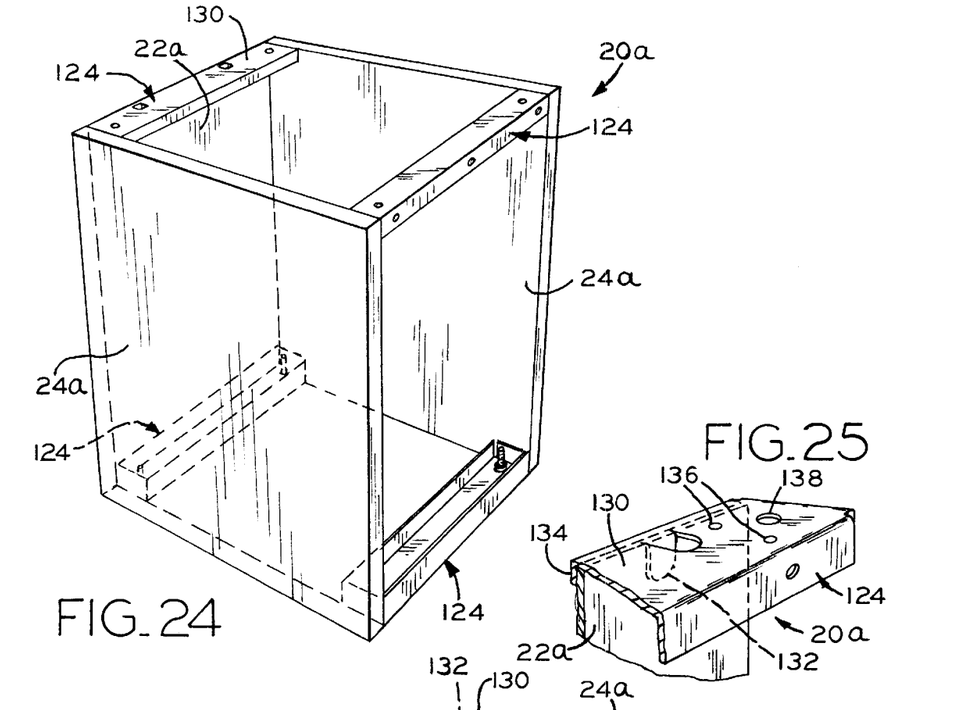
FIG. 24 is a perspective view of an alternative structure for a pedestal unit.
FIG. 25 is a partial perspective view of the spanner of FIG. 27.
Figures 26, 27:
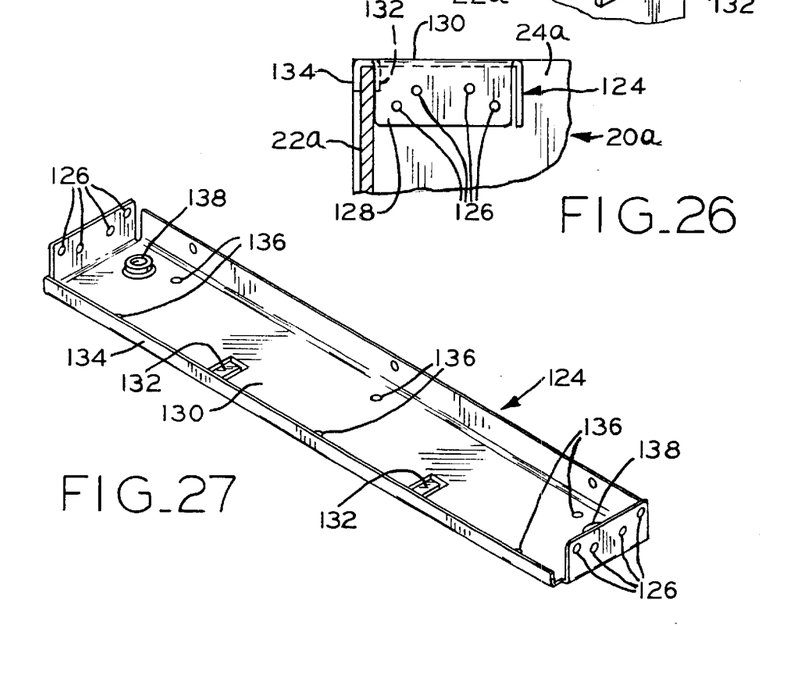
FIG. 26 is a sectional view of the pedestal unit of FIG. 24.
FIG. 27 is a perspective view of the metal spanner of the pedestal unit of FIG. 24.

On large furniture units, such as storage units, clips and studs such as 112, 114 may not have sufficient strength to attach a rear panel and alternative fasteners may be required. An alternative method of attaching a rear panel 22*a* using metal spanners 124 is illustrated in FIGS. 24–26. Middle spanner panel 130 includes tabs 132 formed therein which are used to secure rear panel 22*a*. Tabs 132 are bent to trap panel 22*a* between the tabs and longitudinal flange 134, which is adjacent and perpendicular to middle panel 130, thereby securing panel 22*a* to pedestal structure 20*a*.

As seen in FIG. 27, middle spanner panel 130 also includes apertures 136 through which fasteners may be installed for attaching pedestal structure 20*a* to the bottom of an overlying worksurface panel. Spanners 124 also include two tapped apertures 138 for receiving either levelers 38 or casters 40.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A bracket for a furniture unit, comprising an upper mounting plate and a lower mounting plate, said upper and lower mounting plates vertically distanced from each other, one of said upper and lower mounting plates providing a mount for a caster, the other of said upper and lower mounting plates providing a mount for a floor-engaging leveler, and wherein said bracket provides a brace for the furniture unit.

2. The bracket of claim 1, wherein said bracket comprises at least one sidewall, said sidewall extending between said upper and lower mounting plates.

3. The bracket of claim 1, wherein said lower mounting plate is provided with a first aperture having a lower opening, said leveler received in said first aperture, said caster received in a second aperture having a lower opening, said second aperture opening spaced from said upper mounting plate such that said first aperture lower opening and said second aperture lower opening are at substantially the same level.

4. A bracket for a furniture unit, said bracket comprising a substantially horizontal lower mounting plate, said lower mounting plate provided with a first aperture, a substantially horizontal upper mounting plate, said upper mounting plate being vertically distanced above said lower mounting plate; a leveler extending through said first aperture, said leveler having means for adjusting said leveler from a location above said bracket; and a caster connected to said upper mounting plate.

5. The bracket of claim 4, wherein said leveler comprises a stem threadedly engaged with said first aperture.

6. The bracket of claim 5, wherein said means for adjusting said leveler comprises a hexagonally-shaped leveler stem terminal end.

7. The bracket of claim 4, wherein said first aperture has a lower opening and said caster has a stem. said caster stem being received in a second aperture, said second aperture having a lower opening, said first and second aperture lower openings located at substantially the same horizontal level.

8. The bracket of claim 7, wherein said second aperture extends through a spacer element depending from said upper mounting plate.

9. The bracket of claim 6, wherein said spacer element is a boss integral with said upper mounting plate.

10. The bracket of claim 6, wherein said spacer element is a coupler bolt attached to said upper mounting plate.

11. A bracket for a furniture unit, said bracket comprising an upper mounting plate, a lower mounting plate vertically distanced below said upper mounting plate, at least one sidewall extending between said upper and lower mounting plates, said upper mounting plate and said at least one sidewall defining a chamber open from below, a caster disposed in said chamber, and a leveler connected to said lower mounting plate, and wherein said bracket provides a brace for the furniture unit.

12. The bracket of claim 11, wherein said caster is connected to said upper mounting plate.

13. The bracket of claim 11, wherein said caster extends below said sidewall.

14. A standardized furniture unit comprising at least two substantially vertical side panels, bracing extending between said side panels, the intersection of said bracing and said side panels defining interior corners, and a bracket disposed in at least one said interior corner, said bracket comprising an upper mounting plate and a lower mounting plate, said upper and lower mounting plates vertically distanced from each other, said upper mounting plate having means for connecting a caster to said upper mounting plate, said lower mounting plate having means for connecting a floor-engaging leveler to said lower mounting plate, and at least one of a floor-engaging leveler connected to said lower mounting plate and a caster connected to said upper mounting plate.

15. The furniture unit of claim 14, wherein said bracket comprises said leveler and means for adjusting said leveler from a location above said bracket.

16. The furniture unit of claim 15, wherein said leveler comprises a threaded stem connected to said lower mounting plate.

17. The furniture unit of claim 16, wherein said means for adjusting said leveler comprises a hexagonally-shaped leveler stem terminal end.

18. The furniture unit of claim 14, wherein said bracket further comprises at least one sidewall depending from said upper mounting plate, said at least one sidewall and said upper mounting plate defining a chamber having open from below, said caster disposed within said chamber.

19. A standardized furniture unit comprising:
a structure having at least two substantially vertical panels, each said panel having a lower edge, and bracing extending between said panels;
decorative, non-supportive base skirting disposed about said structure;
a plurality of brackets, each said bracket attached to one of said panels and said bracing, each said bracket comprising an upper mounting plate and a lower mounting plate, said upper and lower mounting plates vertically distanced from each other, one of said upper and lower mounting plates providing a mount for a caster, the other of said supper and lower mounting plates providing a mount for a floor-engaging leveler, each said bracket providing a brace for the furniture unit; and a plurality of support elements attached to said structure and extending between said structure and the floor, said furniture unit supported by said support elements, each said support element being connected to a said bracket and comprising one of a caster and a floor-engaging leveler, each said support element extending below said lower edge of said skirting.

20. The furniture unit of claim 19, wherein said skirting is attached to said structure.

21. The furniture unit of claim 20, wherein said skirting is provided with a surface which abuts a said lower edge of at least one of said panels.

22. The furniture unit of claim 19, wherein said bracket is provided with a substantially horizontal flange extending toward said skirting beneath one of said panels and said bracing.

23. The furniture unit of claim 22, wherein said bracket flange has a width less than the thickness of an adjacent said panel lower edge, said skirting provided with a surface which abuts said panel lower edge outward of said bracket flange, said skirting attached to said structure.

* * * * *